United States Patent [19]
Schatzman

[11] 3,816,016
[45] June 11, 1974

[54] POWER DRILLING MACHINE WITH RESISTANCE TRIGGERED RETRACTION

[75] Inventor: Edward W. Schatzman, South Fort Mitchell, Ky.

[73] Assignee: Avey Machine Tool Co. Division of the Motch & Merryweather Machinery Company, Covington, Ky.

[22] Filed: Nov. 9, 1972

[21] Appl. No.: 305,124

[52] U.S. Cl.................... 408/11, 408/12, 408/140
[51] Int. Cl............................................ B23b 47/24
[58] Field of Search............ 408/10, 11, 12, 17, 140

[56] References Cited
FOREIGN PATENTS OR APPLICATIONS
970,564   10/1958   Germany.............................. 408/11

*Primary Examiner*—Francis S. Husar
*Attorney, Agent, or Firm*—James W. Pearce; Ray F. Schaeperklaus

[57] ABSTRACT

A drilling machine which includes a spindle and a rotatably mounted lead screw mounted for movement parallel to the direction of spindle movement. The lead screw is connected to a spindle housing in driving relation. Resilient means resists movement of the lead screw in a direction opposite to that of housing and spindle feed movement. The lead screw is turned to advance the housing and the spindle. A switch operating means connected to the lead screw is arranged to actuate a switch when the lead screw advances a predetermined distance against the resilient means. Switch controlled mechanism causes retracting of the housing and the spindle.

7 Claims, 18 Drawing Figures

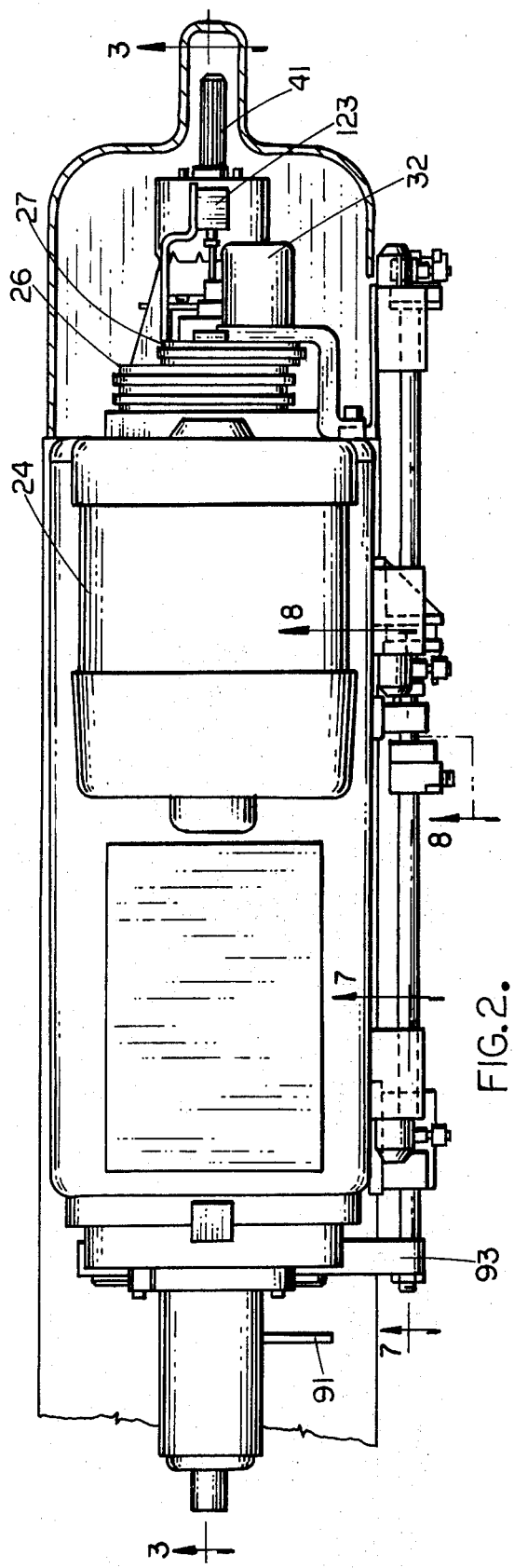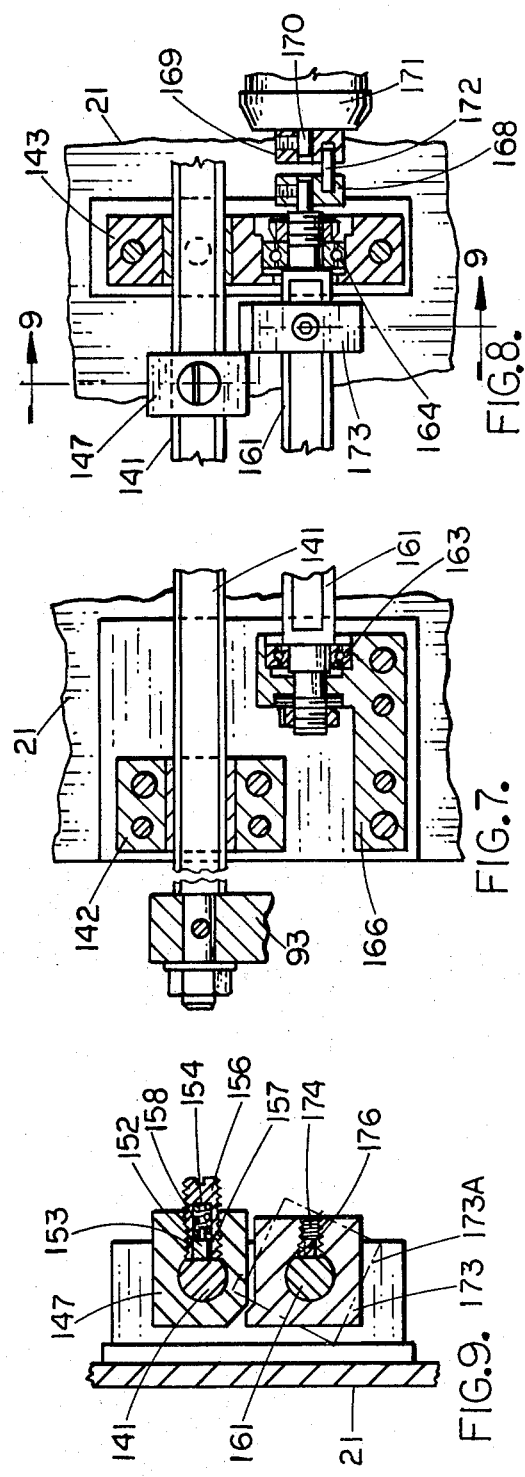

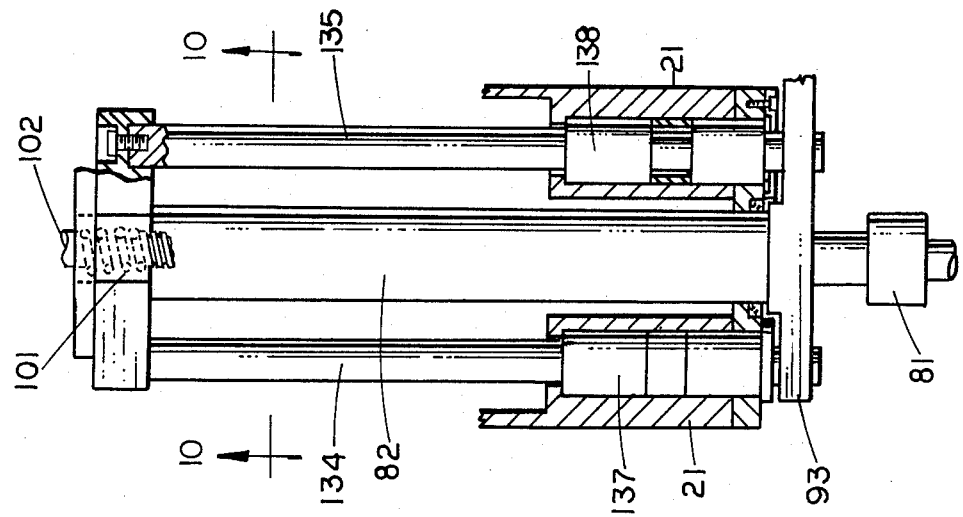
FIG. 6.
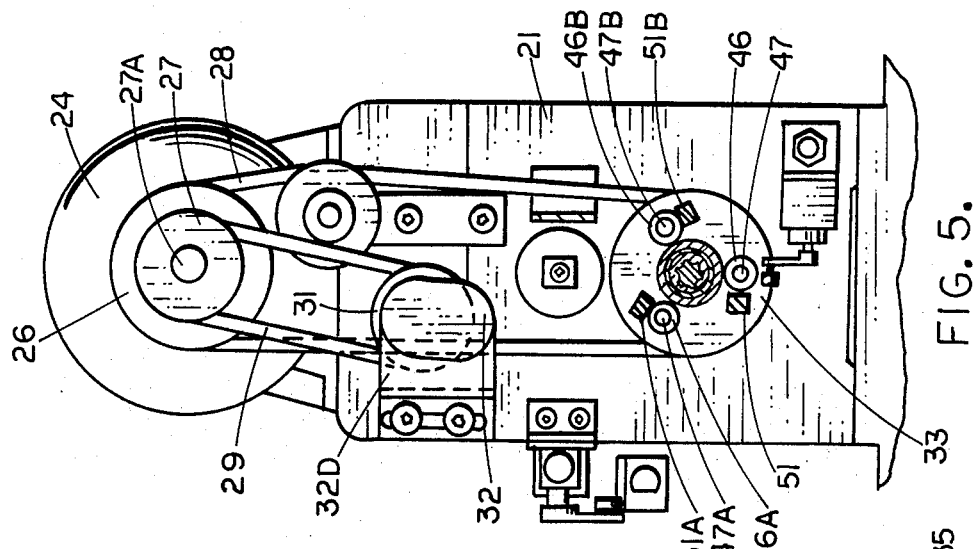
FIG. 5.
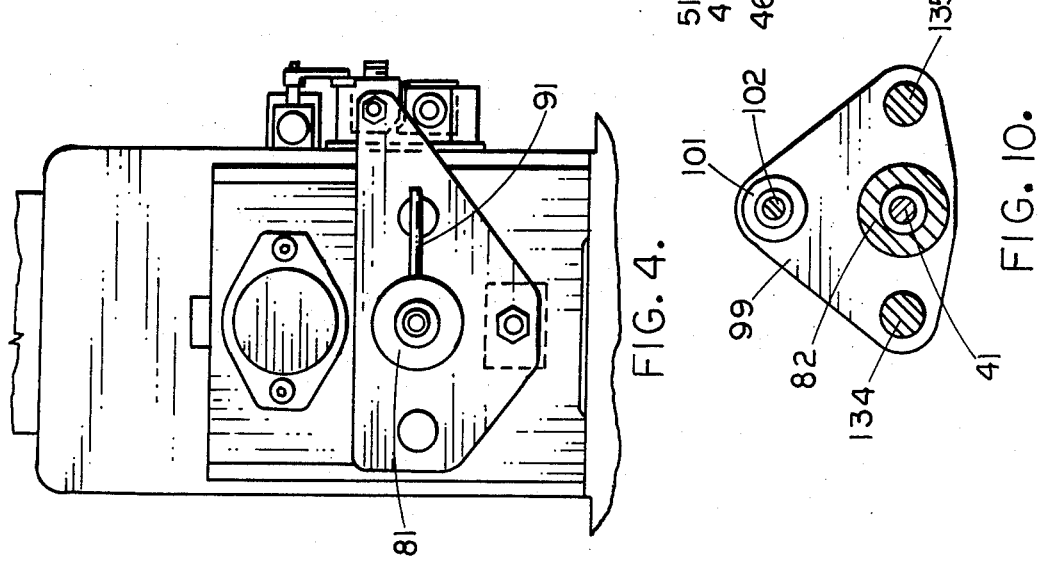
FIG. 4.
FIG. 10.

POWER DRILLING MACHINE WITH RESISTANCE TRIGGERED RETRACTION

This invention relates to power advanced drilling machines. More particularly, this invention relates to mechanism for automatically withdrawing a drill of a drilling machine when the drill meets an obstruction. The machine of this invention represents an improvement over the machines shown in my U.S. Pat. Nos. 3,192,802 and 3,282,618.

An object of this invention is to provide a power advanced and retracted drilling machine in which a drill is automatically retracted when it engages an obstruction which resists drill advance.

A further object of this invention is to provide such a drilling machine in which there is means for automatically retracting the drill when the drill engages an obstruction which resists drill advance and when the drill engages an object which resists turning of the drill.

During drilling, chips may accumulate in the drilled hole surrounding the drill causing added resistance to drill advance, which chips can be removed by withdrawing of the drill. A further object of this invention is to provide controls for a drill advancing and retracting mechanism of the drilling machine which, after the drill has been retracted following meeting with an obstruction to discharge chips, rapidly returns the drill to the position at which the object was engaged and then advances the drill at a drill feeding speed.

Briefly, this invention provides a power advanced drilling machine which includes first drill retraction triggering mechanism which is actuated when the drill advancing drive is subjected to increased resistance during a drilling operation. Controls are provided for the drill advancing and retracting mechanism which cause the drill to be withdrawn a predetermined distance upon triggering and then causes return of the drill to the position at which the obstruction was engaged at a rapid rate before the regular rate of drill feed is resumed.

The above and other objects and features of this invention will be apparent to those skilled in the art to which this invention pertains from the following detailed description and the drawings, in which:

FIG. 2 is a plan view of the drilling machine taken in the direction of the arrows 2—2 in FIG. 1;

FIG. 4 is a fragmentary end elevational view taken in the direction of the arrows 4—4 in FIG. 1;

FIG. 5 is a view in section taken generally on the line 5—5 in FIG. 1;

FIG. 6 is a somewhat schematic view in section taken generally on the line 6—6 in FIG. 1;

FIG. 7 is a view in upright section on an enlarged scale of an end portion of a dog carrying mechanism of the machine;

FIG. 8 is a view in upright section on an enlarged scale of an opposite end portion of the dog carrying mechanism of the machine;

FIG. 9 is a view in section taken on the line 9—9 in FIG. 8;

FIG. 10 is a view in section taken on the line 10—10 in FIG. 6;

In the following detailed description and the drawings, like reference characters indicate like parts.

Figure 1:
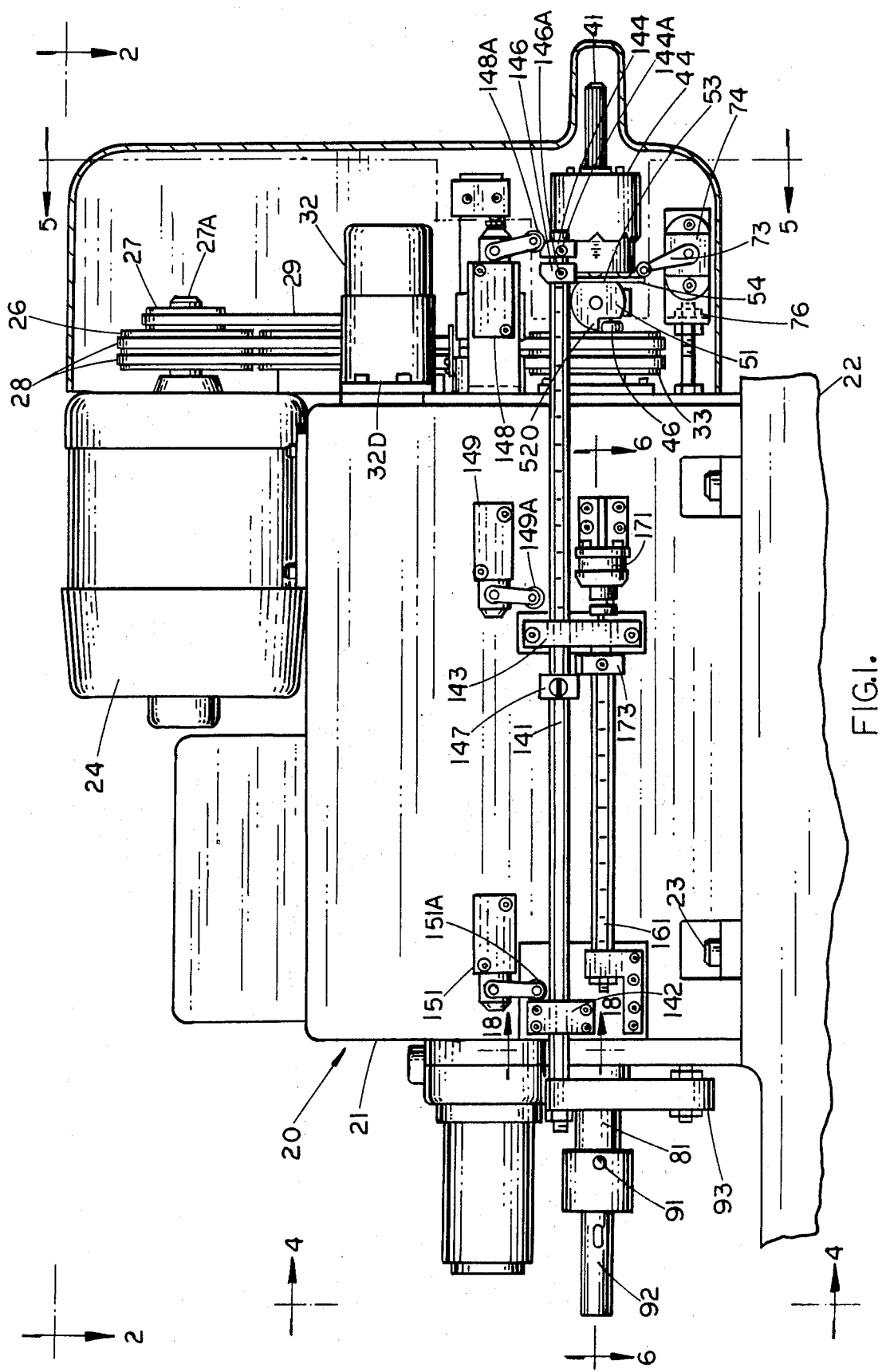
FIG. 1 is a view in side elevation of a drilling machine constructed in accordance with an embodiment of this invention.
Figure 3:
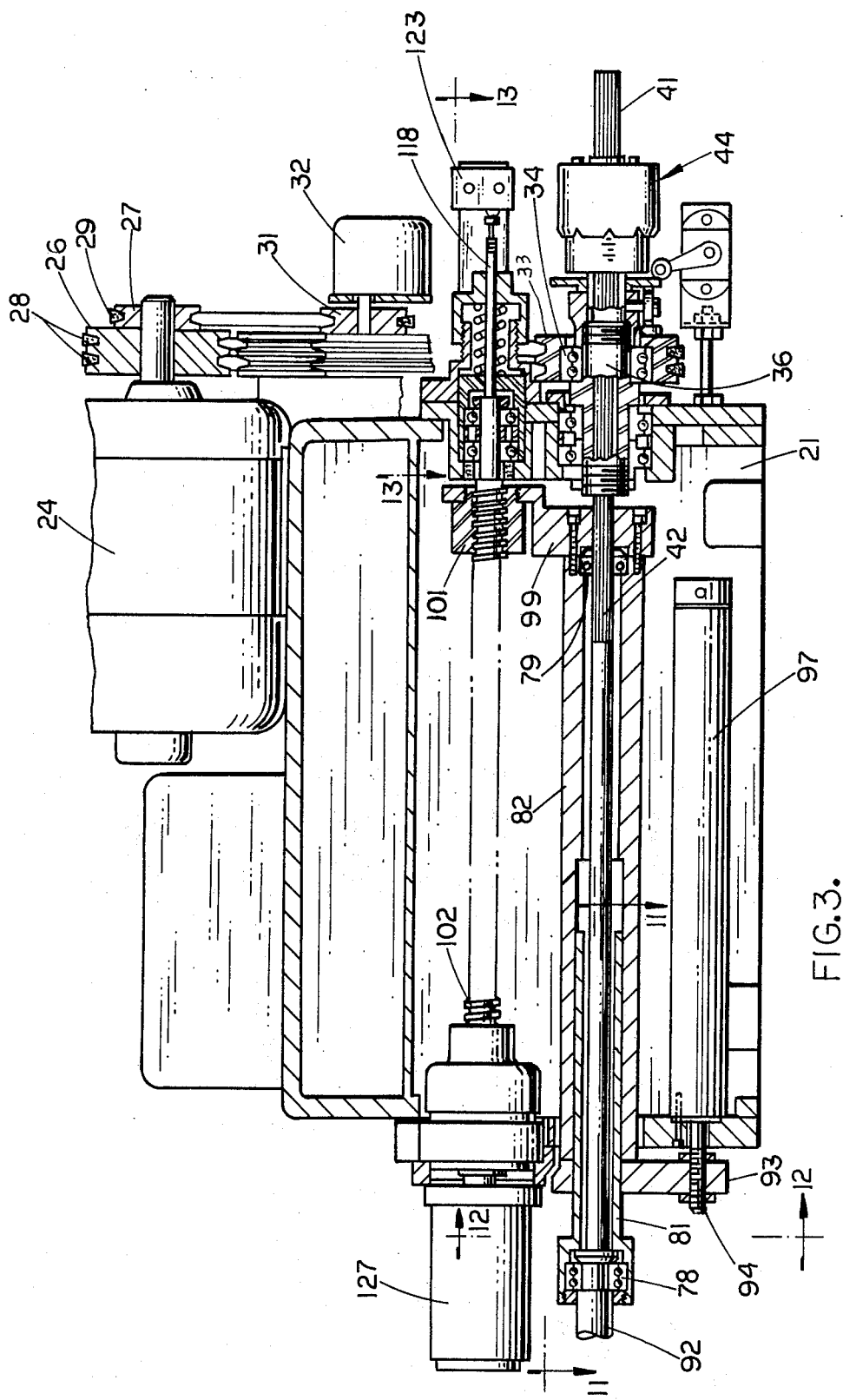
FIG. 3 is a view in section taken on the line 3—3 in FIG. 2.
Figure 14:
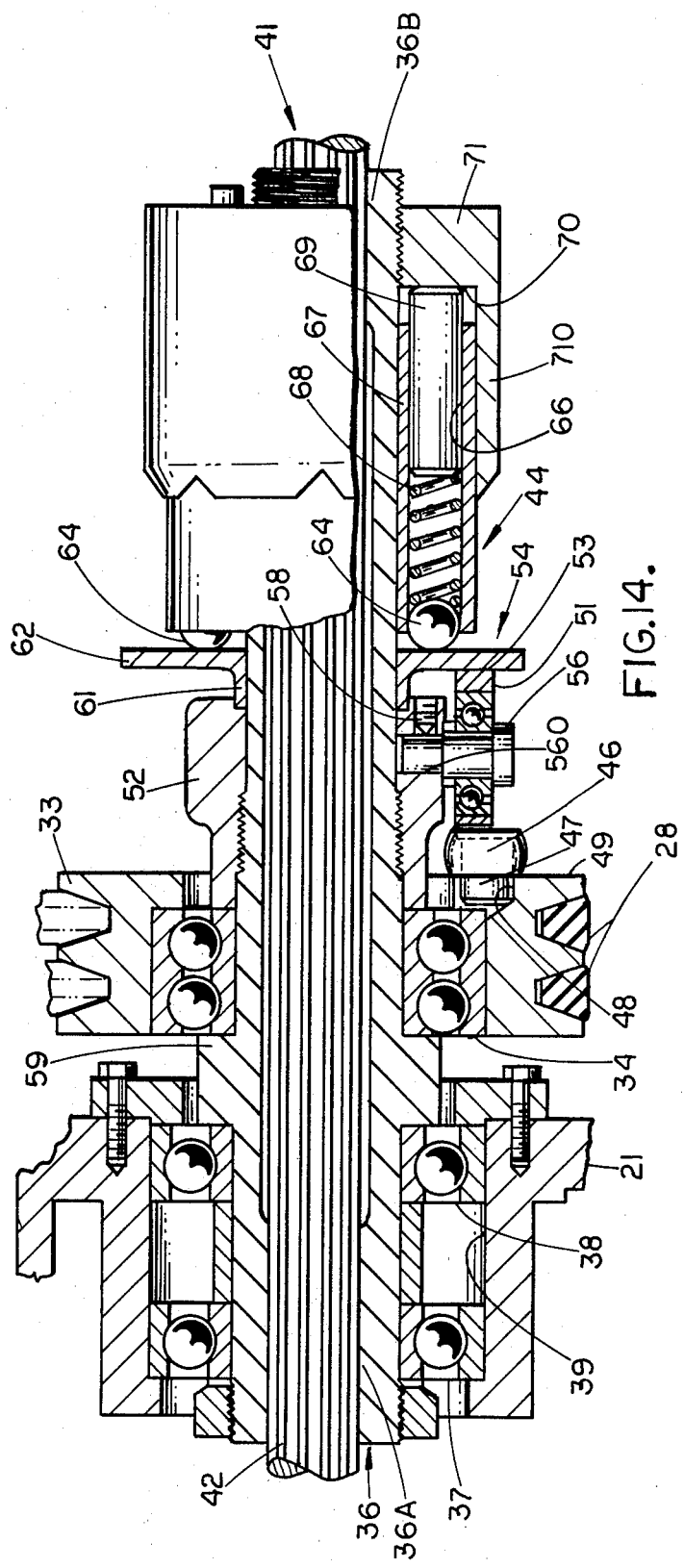
FIG. 14 is an enlarged section view of a portion of a spindle of the machine showing details of a torque controlled driving mechanism.

In FIG. 1 is shown a drilling machine 20 constructed in accordance with an embodiment of this invention which includes a hollow housing 21 that is mounted on an appropriate base support 22 to which the housing 21 is attached by appropriate fasteners 23. A motor 24 is mounted on the housing 21. The motor 24 drives pulleys 26 and 27 mounted on a motor shaft 27A. The pulleys 26 and 27 drive belts 28 and 29, respectively. The belt 29 drives a pulley 31 (FIG. 5) which drives a hydraulic pump 32. The pump 32 is carried by a bracket 32D attached to the housing 21 as shown in FIGS. 1 and 5. The belts 28 drive a pulley 33 which is rotatably mounted on a bearing 34 (FIGS. 3 and 14) carried by a spindle sleeve 36. The spindle sleeve 36 has internally splined sections 36A (FIG. 14) and 36B which support a spindle 41. The spindle sleeve 36, in turn, is rotatably mounted in bearings 37-38 (FIG. 14) carried in an opening 39 in the housing 21. The spindle 41 has a splined section 42 that is mounted inside the spindle sleeve 36 in splined relation thereto so that the spindle sleeve 36 and the spindle 41 turn together and the spindle 41 can be advanced to the right or left as indicated in FIG. 3. The pulley 33 drives the spindle sleeve 36 and the spindle 41 by means of a torque controlled driving mechanism indicated generally at 44. The torque controlled driving mechanism can be similar to that shown and claimed in my U.S. Pat. No. 3,192,802. The torque controlled driving mechanism 44 includes the rollers 46, 46A and 46B (FIG. 5) which are mounted on studs 47, 47A and 47B, respectively. As shown in FIG. 14, the stud 47 is mounted in a socket 48 in the pulley 33, and the stud 47 extends outwardly of an upright face 49 of the pulley 33 with the axis of the stud 47 and the roller 46 parallel to the axis of the pulley 33, the other studs 47A and 47B and the rollers 46A and 46B being similarly mounted.

The rollers 46, 46A and 46B engage cams 51, 51A (FIG. 5) and 51B, respectively, which are mounted on a nut 52 (FIG. 14), in the manner that the cam 51 is shown in FIGS. 1 and 14. The other cams are similar, and only the cam 51 will be described in detail. The cam 51 includes a hook portion 520 (FIG. 1) engageable by the roller 46 and a flat opposite face 53 engageable with a plate 54. As shown in FIG. 14, the cam 51 is rotatably mounted on a stud 56 carried by the nut 52. The stud 56 is held in place in a radial socket 560 in the nut 52 by a set screw 58. The nut 52 is threaded on the spindle sleeve 36 and engages the inner race of the bearing 34 to hold the inner race against a flange 59 of the spindle sleeve 36. The plate 54 is annular and includes a collar portion 61, which is slidable along the spindle sleeve 36 and an outwardly extending flange portion 62 which can engage the cams 51, 51A and 51B. The plate 54 is movable lengthwise of the spindle sleeve 36. The plate 54 is held in engagement with the cams by spring pressed balls 64, two of which are shown in FIG. 14. Each of the balls 64 is mounted in a socket 66 in a barrel member 67. Each of the balls 64 is urged to the left by a compression spring 68 mounted in the associated socket 66. A pin 69 mounted in the socket 66 engages a base wall 70 of an annular, generally cup-shaped barrel housing 71 and backs up the spring 68. The barrel member 67 is slidably mounted on the spindle sleeve 36 and inside a side wall 710 of the barrel housing 71. The barrel housing 71 in turn is threaded on the spindle sleeve 36. The mouth of each of the sockets 66 extends inwardly to retain the associated ball therein. In a preferred structure, six balls are mounted in sockets arranged in equally spaced relation around the axis of the barrel member 67. In normal driving of the spindle, the plate 54 remains in the position shown. However, when a drill (not shown) carried by the spindle meets an obstruction which restrains turning of the spindle 41, increased torque causes the rollers 46, 46A and 46B to advance around the spindle sleeve 36 sufficiently to cause the cams 51, 51A and 51B to turn to advance the plate 54 to the right, as shown in FIG. 14, depressing the balls 64 into their associated sockets. When the plate 54 is advanced to the right, a switch actuator 73 (FIG. 1) of a switch 74 is swung clockwise as shown in FIG. 1 to actuate the switch 74. The switch 74 is mounted on a bracket 76 supported on the housing 21.

Figure 11:
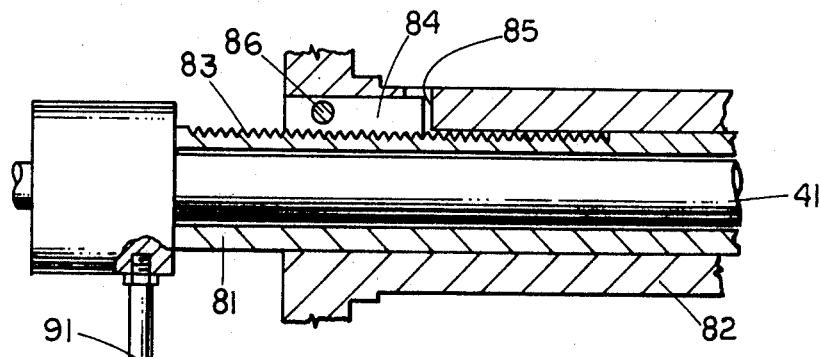
FIG. 11 is a view in section taken on the line 11—11 in FIG. 3.
Figure 18:
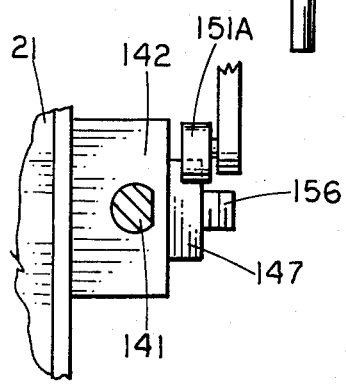
FIG. 18 is a view in section taken on the line 18—18 in FIG. 1.
Figure 12:
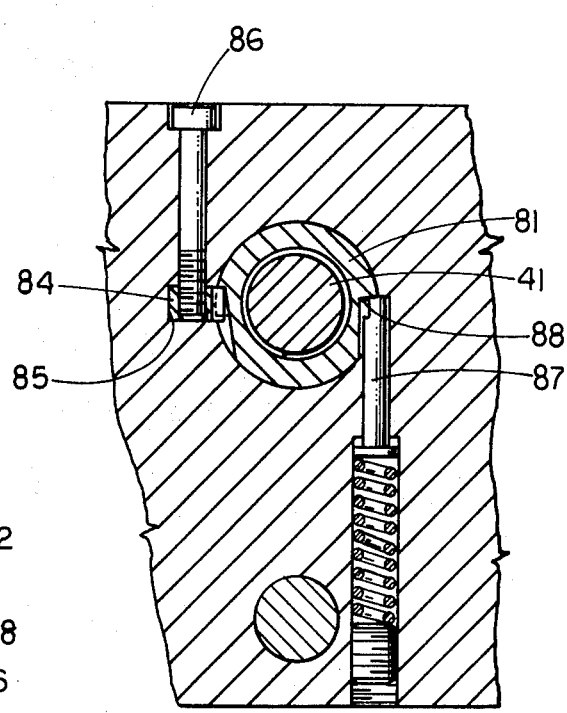
FIG. 12 is a view in section taken on the line 12—12 in FIG. 3.

The spindle 41 (FIG. 3) is rotatably mounted in bearings 78 and 79. The bearing 78 is mounted in a spindle sleeve 81. The spindle sleeve 81 is telescopically mounted in a tubular housing 82. Teeth 83 (FIG. 11) on the spindle sleeve 81 engage complementary teeth on an insert 84, which is held in a socket 85 in the housing 82 by a bolt 86, to hold the spindle sleeve 81 and the housing 82 in selected relative position. As shown in FIG. 12, a spring pressed plunger 87, which engages a radial shoulder 88 on the spindle sleeve 81 urges the spindle sleeve 81 to the position shown at which the teeth engage. A handle 91 (FIG. 4) mounted on the spindle sleeve 81 can be used for turning the spindle sleeve 81 to cause release of the teeth so that the relative positions of the spindle sleeve 81 and the housing 82 can be adjusted.

The bearing 79 (FIG. 3) is mounted inside the housing 82 at a position spaced from the spindle sleeve 81. A chuck (not shown) can be mounted on an outwardly extending portion 92 (FIG. 1) of the spindle to carry a drill (not shown) in the usual fashion.

A first flange plate 93 extends outwardly of the housing 82. The first flange 93 is attached to a piston rod 94. The piston rod 94 is driven by a piston 96 (FIG. 16) which works in a hydraulic cylinder 97. Hydraulic fluid can be introduced into the cylinder 97 to effect rapid advance of the housing 82 and the spindle 41 to the left as shown in FIG. 3 and rapid return of the housing 82 and the spindle 41 to the right, as will be explained in greater detail hereinafter.

Figure 13:
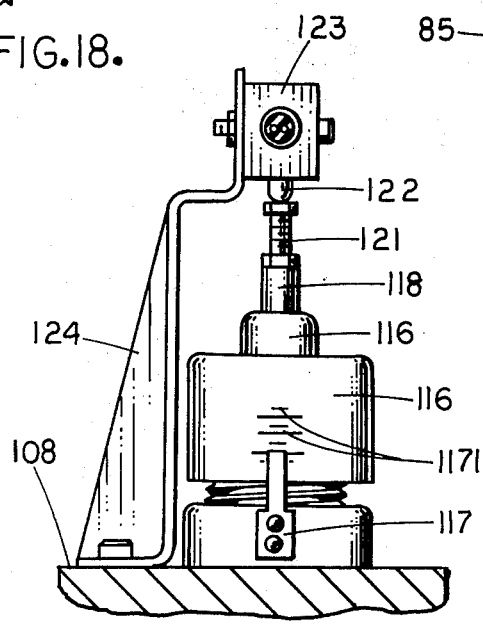
FIG. 13 is a view in section taken generally on the line 13—13 in FIG. 3.
Figure 15:
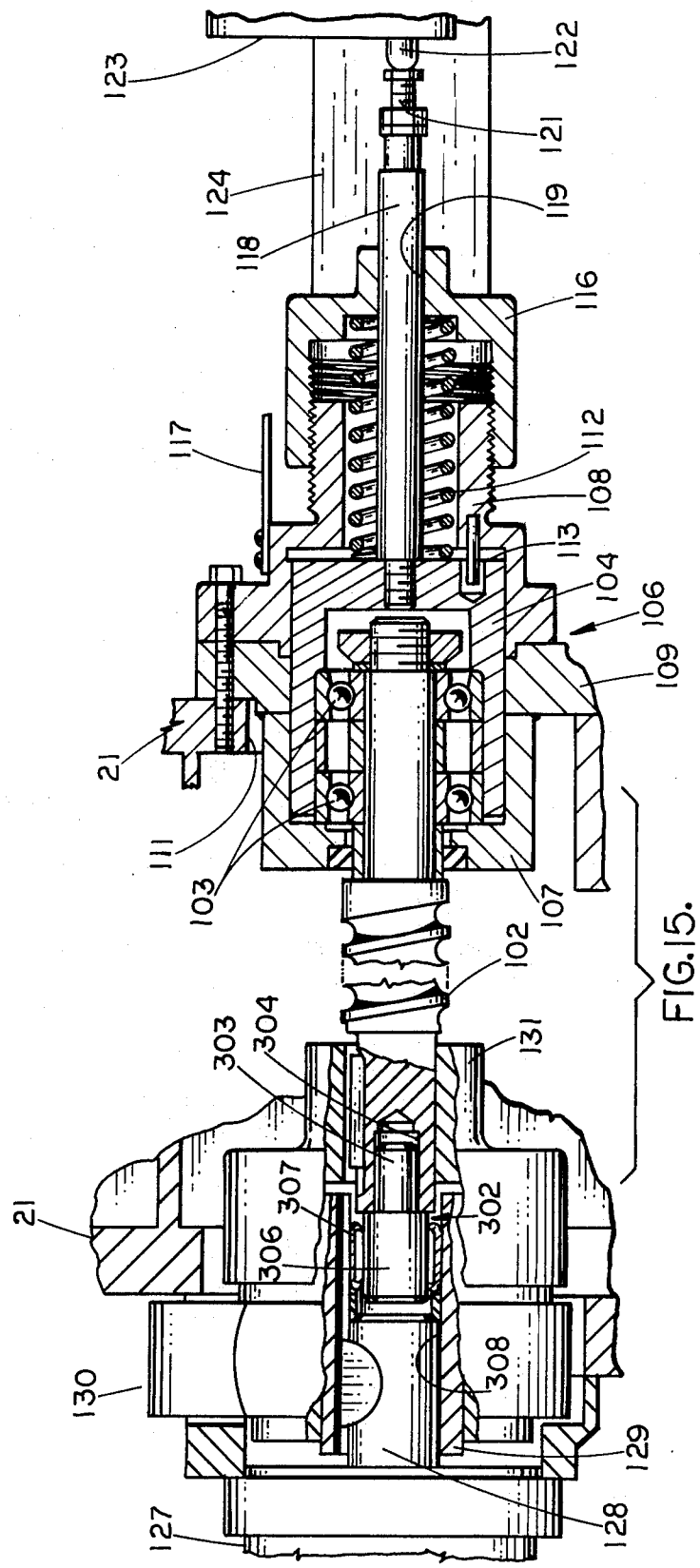
FIG. 15 is an enlarged section view showing lead screw driving and supporting mechanisms.

A second flange plate 99 mounted on the housing 82 carries a nut 101 which is threaded on a lead screw 102. The right hand end portion (FIG. 15) of the lead screw 102 is rotatably mounted in bearings 103. The bearings 103 are mounted in a cup shaped bearing support 104, which is slidably mounted in a sleeve assembly 106. The assembly 106 includes a generally cup shaped first annular guide 107 and a second annular guide or spring housing 108 mounted on a plate 109. The plate 109 is attached to the housing 21 overlying an opening 111 therein. A compression spring 112 engages an end wall 113 of the bearing support 104 to urge the bearing support 104, the bearings 103 and the lead screw 102 to the left as shown in FIGS. 3 and 15. A cup shaped cap or bearing cup 116 is threaded on the guide 108 and backs up the spring 112. The cap 116 can be turned to adjust the load on the spring 112. An indicator 117 (FIG. 13) mounted on the guide 108 and graduations 1171 on the cap 116 provide an indication of the degree of compression of the spring 112. A trip rod 118 is mounted on the bearing support 104 (FIG. 15) and extends outwardly through an axial opening 119 in the cap 116. An outer end portion of the trip rod 118 carries an adjustable screw 121 which engages a push button 122 (FIG. 13) of a switch 123 to actuate the switch 123 when the lead screw 102 is moved to the right as shown in FIGS. 3 and 15 to move the trip rod 118 to the right. The switch 123 is mounted on a bracket 124 (FIG. 13) attached to guide 108.

The lead screw 102 is driven by a hydraulic motor 127 (FIG. 3). The motor 127 drives a shaft 128 (FIG. 15) which is keyed to a first clutch member 129 of a clutch assembly 130. The lead screw 102 is keyed to a second clutch member or clutch cup 131. However, the lead screw 102 can move to the right and left inside the clutch cup 131 to a limited extent. The clutch cup 131 is free to turn in either direction when the clutch is disengaged, and during rapid advance and return of the spindle, the lead screw 102 can turn as the nut 101 (FIGS. 3 and 6) is advanced and retracted. When the clutch members 129 and 131 (FIG. 15) are engaged, the lead screw 102 is turned to advance the housing 82 (FIGS. 3 and 6) and the spindle 41 (FIG. 3) in a feed stroke. However, if the drill (not shown) carried by the spindle 41 encounters an obstruction which resists advance of the spindle 41 to the left, as shown in FIG. 3, continued turning of the lead screw 102 advances the lead screw 102 to the right as shown in FIG. 3 to advance the trip rod 118 to the right to actuate the switch 123. A positioning pin 302 (FIG. 15) having a shank 303 mounted in an axial socket 304 in the lead screw 102 is provided with an enlarged head 306 rotatably mounted in a bearing 307 mounted in a central bore 308 of the first clutch member 129.

As shown in FIGS. 1 and 7, a dog carrying rod 141 is attached to the flange plate 93. The rod 141 is slidably mounted in guides 142 and 143 mounted on the housing 21. Dogs 144, 146 and 147 mounted on the rod 141 are constructed to engage actuators 148A, 149A and 151A of limit switches 148, 149 and 151, respectively. The dogs 144 and 146 can be firmly held on the rod 141 at selected points thereon by set screws 144A and 146A, respectively. The dog 144 is positioned so that the switch 148 is actuated when the spindle 41 is fully retracted. The dog 146 is positioned so that the switch 149 is actuated when the spindle 41 is advanced to the limit of advance in a drilling operation when the drilling operation has been carried to a selected depth. The dog 147 is slidably mounted on the rod 141. As shown in FIG. 9, a spring pressed shoe 152 engages a face 153 of the rod 141. The shoe 152 is mounted in a socket 154 in a set screw member 156 which is threaded in a socket 157 in the dog 147. A compression spring 158 in the socket 154 urges the shoe 151 against the rod 141. The dog 147 is held on the rod 141 sufficiently tightly to actuate the limit switch 151.

A rod 161 is rotatably mounted adjacent and parallel to the rod 141. The rod 161 is rotatably mounted in bearings 163 (FIG. 7) and 164 (FIG. 8). The bearing 163 (FIG. 7) is mounted in a bearing support 166. The bearing 164 (FIG. 8) is mounted in the guide 143.

A crank 168 (FIG. 8) is mounted on the rod 161. The crank 168 is connected to a crank 169 carried by a shaft 170 of a rotary solenoid 171 by a pin 172. A feed reset dog 173 (FIGS. 8 and 9) is mounted on the rod 161 to turn therewith. The feed reset dog 173 is held at a selected position on the rod 161 by a set screw 174 (FIG. 9) and a plug 176. When the solenoid 171 is energized, the rod 161 is turned to turn the feed reset dog 173 to the position shown in dot-dash lines in FIG. 9 at 173A at which position the feed reset dog can be engaged by the dog 147 as the rod 141 is returned, as will be explained in greater detail hereinafter.

The operation of the machine will now be described with particular reference to FIGS. 16 and 17, which show electrical and hydraulic connections of the machine. Electric power is supplied by main leads 181 and 182 through contacts of a main switch 183 to leads 184 and 186, which are connected to opposite sides of a primary winding of a transformer 187. A secondary winding of the transformer 187 supplies power to leads 188 and 189. When a normally open push button switch 191 is closed, a motor relay 192 is energized to close contacts 192A and 192B thereof energizing the motor 24 and closing hold-in contacts 192C thereof. The hold-in contacts 192C also connect the lead 188 to a power lead 194. An overload relay 196 is provided between the contacts 192A and the motor 24 which, if energized, opens contacts 196A to de-energize the motor relay 192. When the motor 24 is to be stopped, as when the machine is to be shut down, a normally closed push button switch 197 is open de-energizing the motor relay 192.

When a cycle of the machine is to be instituted, a cycle swith 198 is instantaneously moved to its other position to close contacts 198A thereof energizing a control relay 199 and opening contacts 198B to de-energize a control relay 201, if the control relay is energized, as will be described more fully hereinafter.

Energizing of the control relay 199 closes hold-in contacts 199A thereof and also closes contacts 199B thereof to energize solenoids 203A and 204A. Energizing of the solenoid 203A advances a three position valve 203 (FIG. 16) to the right. Energizing of the solenoid 204A moves a valve 204 to its alternate position. Fluid under pressure is supplied to the valve 203 by the pump 32 which directs the fluid into a fluid pressure line 206. An appropriate pressure fluid into a fluid pressure line 206. An appropriate pressure relief valve 207 and a gauge 208 can be connected to the fluid pressure line 206. When the valve 203 is moved to the right, fluid under pressure is directed into a line 209 and through the valve 204 to a line 210 which directs the fluid into the right hand end of the cylinder 97 to advance the piston 96 and the piston rod 94 to the left causing rapid advance of the spindle. Fluid returns from the left hand end of the cylinder 97 through a line 212 and the valve 203 to a discharge line 213.

When the housing 82 and the spindle 41 have been advanced to the position at which a drilling operation commences, the dog 147 (FIG. 1) engages the switch actuator 151A to actuate the switch 151 to open contacts of the limit switch 151 (FIG. 17) de-energizing the solenoid 204A. When the solenoid 204A is de-energized, the valve 204 (FIG. 16) returns to the position shown at which fluid under pressure is introduced into a line 214 to actuate the clutch assembly 130 (FIGS. 15 and 16) and to actuate a pilot actuated check valve 216 in a line 217. Fluid under pressure from the line 209 passes through a check valve 218, the hydraulic motor 127, a throttle valve 219, the line 217, the pilot actuated check valve 216, the line 121, and the valve 203 to the discharge line 213 so that the motor 127 is driven to drive the clutch 130 and the lead screw 102. As the lead screw 102 advances the spindle 41 and the rod 141 (FIG. 1), the dog 147 is restrained by the guide 142, and the rod 141 advances through the dog 147. During driving of the lead screw the right hand end of the cylinder 97 is connected through the line 210 and the valve 204 to a discharge line 213A. The left hand end of the cylinder 97 is connected through the line 212 and the valve 203 to the discharge line 213.

Figure 17:
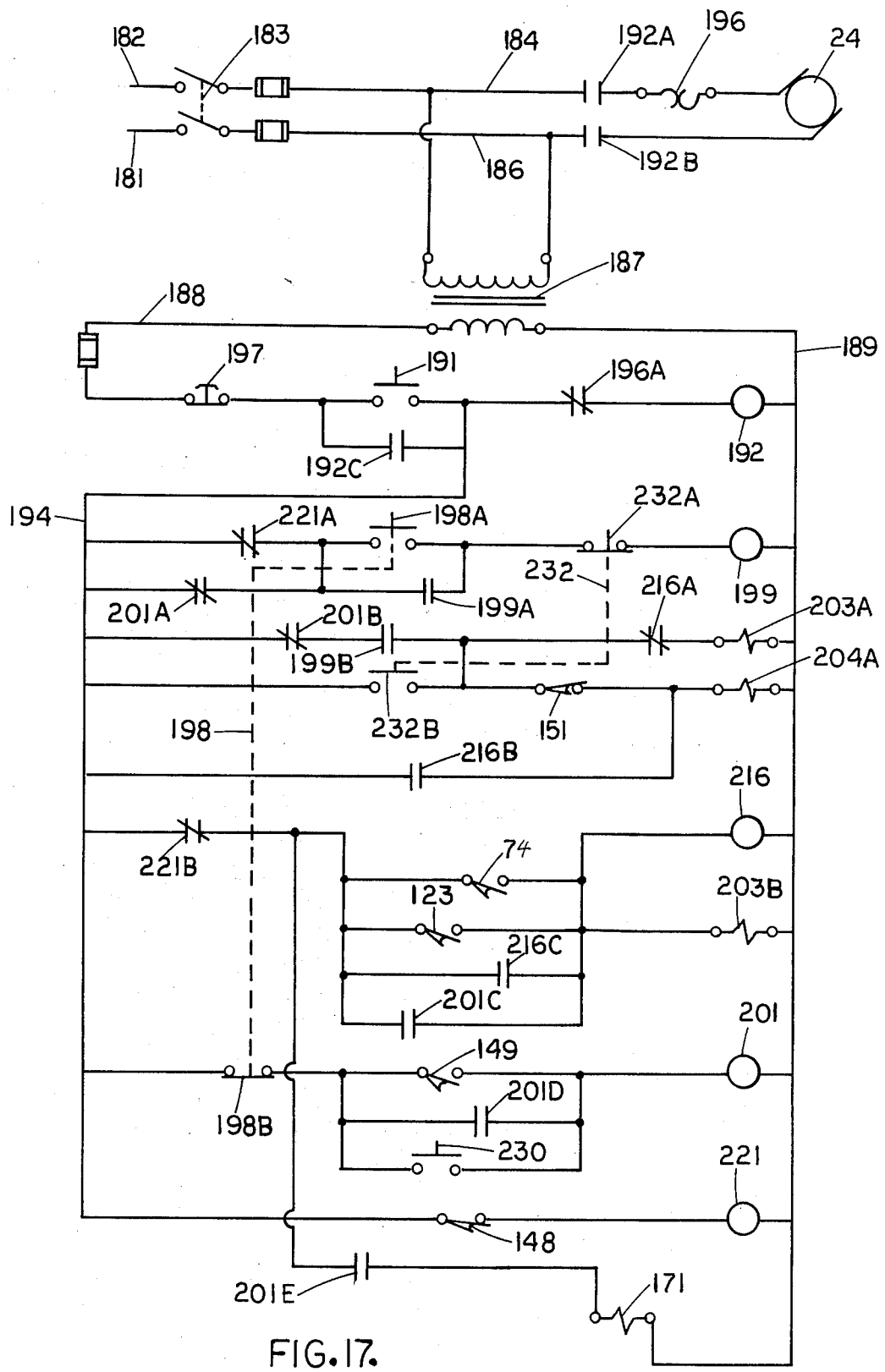
FIG. 17 is a schematic view of electrical connections of the machine.

When the limit of drilling is reached, the full depth limit switch 149 is actuated as the dog 146 engages the actuator 149A to close the contacts of the limit switch 149 (FIG. 17). Closing of the switch 149 energizes the control relay 201 to open contacts 201A, to open contacts 201B to de-energize the solenoid 203A and to keep the solenoid 204A de-energized, to close contacts 201C to energize a control relay 216 and a solenoid 203B, to close hold-in contacts 201D, and to close contacts 201E energizing the rotary solenoid 171 Energizing of the rotary solenoid 171 causes the rod 161 (FIG. 9) to turn to the position at which the dog 173 is indicated in dot-dash lines at 173A. Energizing of the relay 216 opens contacts 216A thereof to de-energize the solenoid 203A, closes contacts 216B to energize the solenoid 204A and closes hold-in contacts 216C.

Energizing of the solenoid 203B advances the valve 203 (FIG. 16) to the left so that fluid from the pressure line 206 passes through the line 212 to the left hand end of the cylinder 97 to cause rapid retraction of the spindle, fluid returning through the line 210 and the valve 204, the line 209 and the valve 203, to the discharge line 213. As the spindle returns, the dog 147 (FIG. 8) is restrained by the dog 173 so that when the spindle has been fully retracted, the dog 147 is returned to its original position on the rod 141. When the spindle has been fully retracted, the dog 144 (FIG. 1) engages the switch actuator 148A to close the contacts of the switch 148 (FIG. 17) to energize a relay 221 to permit contacts 221A and 221B therof to open. The switch 148 is a normally open switch but is shown in the position at which it is held closed when the spindle is fully retracted. Opening of the contacts 221A de-energizes the cycle control relay 199. Opening of the contacts 221B de-energizes the rotary solenoid 171 to permit the rod 161 and the dog 173 to return to the full line position of FIG. 9. Opening of the contacts 221B (FIG. 17) also de-energizes the solenoid 203B and the control relay 216 to complete a cycle. The control relay 201 remains energized until the cycle switch 198 is again moved to its other position to start a new cycle.

Figure 16:
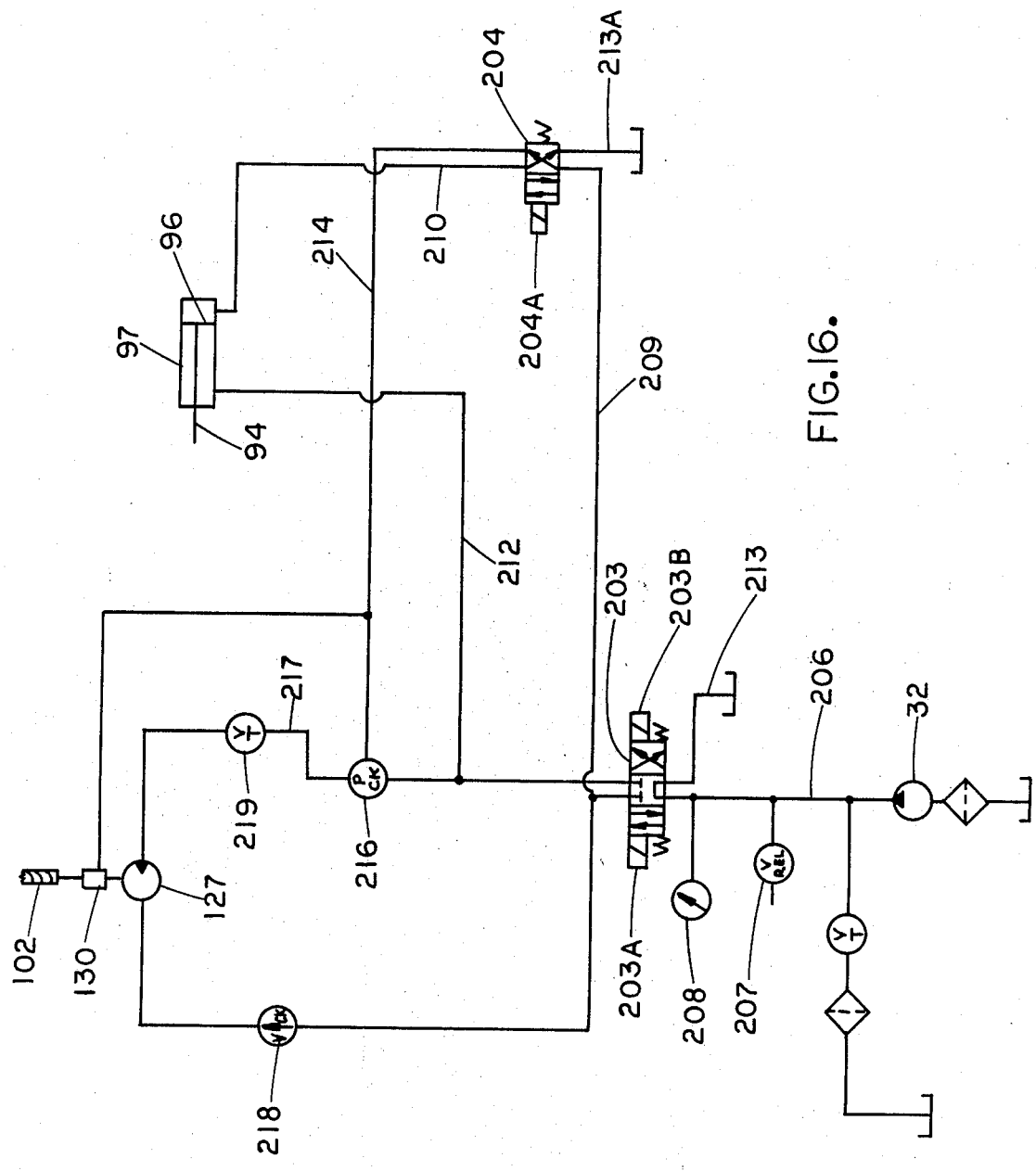
FIG. 16 is a schematic view of hydraulic connections of the machine.

If, during the feed stroke, an obstruction is encountered which restrains rotation of the spindle to cause closing of the switch 74 or when an obstruction is encountered restraining feed of the spindle causing closing of the switch 123, the control relay 216 and the solenoid 203B are energized moving the valve 203 to the left as shown in FIG. 16 and causing rapid retraction of the spindle as already described. However, the rotary solenoid 171 (FIGS. 1 and 17) is not energized so that, as the rod 141 is retracted, the dog 147 (FIGS. 8 and 9) passes the dog 173 without engagement. When the spindle is fully retracted, the limit switch 148 (FIG. 17) closes to energize the relay 221 to open contacts 221B de-energizing the control relay 216 and the solenoid 203B terminating rapid retraction. De-energizing of the control relay 216 permits the contacts 216A thereof to close energizing the solenoid 203A to advance the valve 203 to the right as shown in FIG. 16 to cause rapid advance of the spindle. Rapid advance continues until the spindle reaches the position at which the obstacle was encountered whereupon the dog 147 (FIG. 1) engages the switch actuator 151A to open the switch 151 (FIG. 17) de-energizing the solenoid 204A returning the machine to feed advance by turning of the lead screw 102, and the cycle then continues as already described.

If it is desired to retract the machine, as when the machine is stopped at a position away from fully retracted position, a manually operated normally open push button switch 230 can be closed instantaneously to energize the control relay 201 causing rapid retracting of the machine.

If it is desired to initiate a feed advance without a full cycle, a manual feed switch 232 can be moved to its other position to open contacts 232A thereof de-energizing the cycle relay 199 and closing contacts 232B to energize the solenoids 203A and 204A to cause a feed advance, which continues until the switch 232 is released to return to the position shown.

The drilling machine illustrated in the drawings and described above is subject to structural modification without departing from the spirit and scope of the appended claims.

I claim:

1. A drilling machine which comprises a spindle, a housing, means for rotatably mounting the spindle in the housing, means for mounting the housing for movement with the spindle in spindle advancing and retracting directions, a lead screw, means for rotatably mounting the lead screw for movement parallel to the direction of housing movement, means for connecting the lead screw to the housing in driving relation, resilient means resisting movement of the lead screw in a direction opposite to that of housing and spindle feed movement, means for turning the lead screw to advance the housing and the spindle, rapid transverse means for rapidly advancing and retracting the housing and the spindle, the means for turning the lead screw including motor driven clutch means and means for releasing the clutch means when the rapid traverse means advances and retracts the housing and the spindle, the lead screw being free to rotate during driving by the rapid traverse means, switch means, switch operating means connected to the lead screw and arranged to actuate the switch when the lead screw advances a predetermined distance against the resilient means, and means operated by the switch means for causing the rapid traverse means to retract the housing and the spindle.

2. A drilling machine as in claim 1 wherein the rapid traverse means for rapidly advancing and retracting the housing and the spindle includes a hydraulic cylinder and means connected to the housing and driven by the cylinder for driving the housing and the spindle in rapid traverse.

3. A drilling machine as in claim 1 wherein the means for rotatably mounting the lead screw includes a barring cup, bearings in the bearing cup rotatably supporting an end portion of the lead screw, and means for supporting the bearing cup for movement lengthwise of the axis of the lead screw, an elongated switch operating trip rod is attached to the bearing cup to move therewith, an annular spring housing surrounds a portion of the trip rod with another portion of the trip rod extending outwardly of the spring housing, a compression spring is mounted in the spring housing engaging the bearing cup to urge the bearing cup in spindle feed direction, and the outwardly extending portion of the trip rod engages the switch operating means to actuate the switch when the lead screw is advanced the predetermined distance.

4. A drilling machine as in claim 1 wherein there is means for rotating the spindle including a spring urged member which shifts position when there is a predetermined resistance to turning of the spindle, second switch means, second switch operating means engageable by said member when said member shifts position to actuate the second switch means, and means operated by the second switch means for retracting the housing and the spindle.

5. A drilling machine which comprises a spindle, a housing, means for rotatably mounting the spindle in the housing, means for mounting the housing for movement with the spindle in spindle advancing and retracting directions, a lead screw, means for rotatably mounting the lead screw for movement parallel to the direction of housing movement, means for connecting the lead screw to the housing in driving relation, resilient means resisting movement of the lead screw in a direction opposite to that of housing and spindle feed movement, means for turning the lead screw to advance the housing and the spindle, switch means, switch operating means connected to the lead screw and arranged to actuate the switch when the lead screw advances a predetermined distance against the resilient means, means operated by the switch means for retracting the housing and the spindle, rod means attached to the housing to move with the housing, first and second dog means mounted on the rod means, first and second limit switches having actuators engageable with the first and second dog means, the actuator of the first limit switch being engageable with the first dog means when the housing is fully retracted, the actuator of the second limit switch being engageable with the second dog means when the housing is fully extended, a third limit switch having a switch actuator, a third dog means mounted on the rod means, the actuator of the third limit switch being engageable with the third dog means when the housing is at a position for shifting from rapid advance to a feed stroke, the rapid traverse means advancing the housing until the third limit switch is actuated, means controlled by the third limit switch for engaging the clutch means when the third limit switch is actuated to cause feed advance of the housing, means actuated by the second limit switch for releasing the clutch means and for causing rapid retraction of the housing when the second limit switch is actuated, and means controlled by the first limit switch for arresting rapid retraction of the housing when the first limit switch is actuated.

6. A drilling machine as in claim 5 wherein the third dog means is slidably mounted on the rod means, stop means is provided for arresting the third dog means when the third limit switch has been actuated so that the rod means moves to position the third dog means at a new position on the rod means, the third dog means remaining in the new position when the housing is retracted after actuation of the lead screw actuated switch means, the housing being advanced to the position at which it was when the lead screw actuated switch means was actuated upon re-advance until the third dog means in its new position again actuates the third limit switch to return the machine to feed advance.

7. A drilling machine as in in claim 6 wherein there is dog resetting means engageable with the third dog means during retraction of the housing after actuation of the second limit switch which resets the third dog means at its original position on the rod means.

* * * * *

UNITED STATES PATENT OFFICE
CERTIFICATE OF CORRECTION

Patent No. 3,816,016      Dated June 11, 1974

Inventor(s) EDWARD W. SCHATZMAN

It is certified that error appears in the above-identified patent and that said Letters Patent are hereby corrected as shown below:

In claim 3:

Column 8, lines 11-12, "barring" should be

-- bearing --.

Signed and sealed this 5th day of November 1974.

(SEAL)
Attest:

McCOY M. GIBSON JR.
Attesting Officer

C. MARSHALL DANN
Commissioner of Patents